June 30, 1970      L. R. TIFT      3,517,753
TRUCK UNDERBODY SCRAPER FOR HIGHWAY MAINTENANCE VEHICLES
Filed Dec. 4, 1967      3 Sheets-Sheet 1

INVENTOR:
LEO R. TIFT
BY
Donnelly, Mentag & Harrington
ATTORNEYS

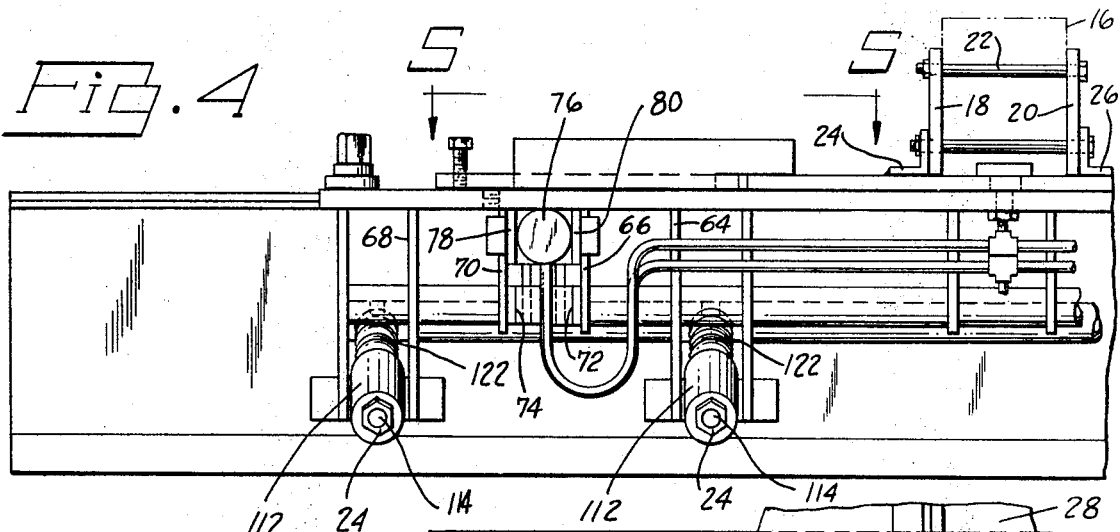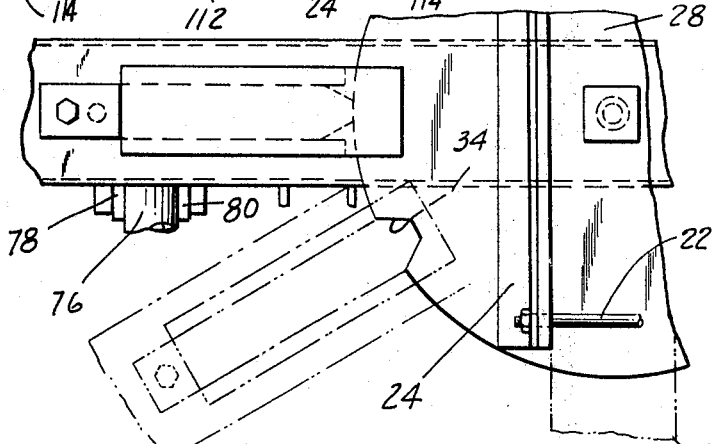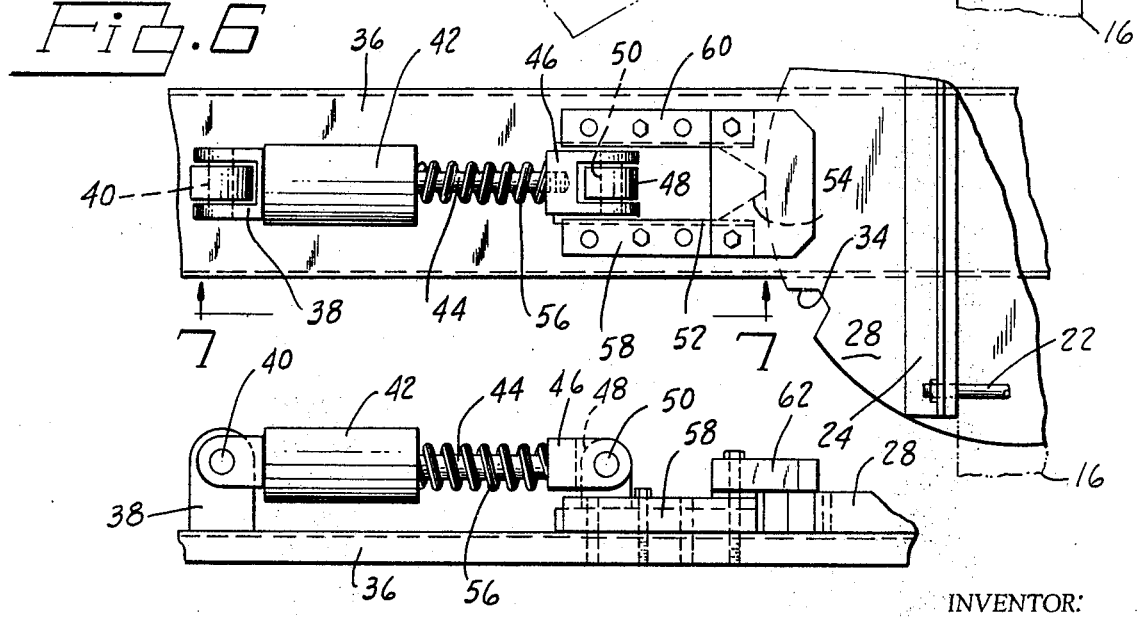

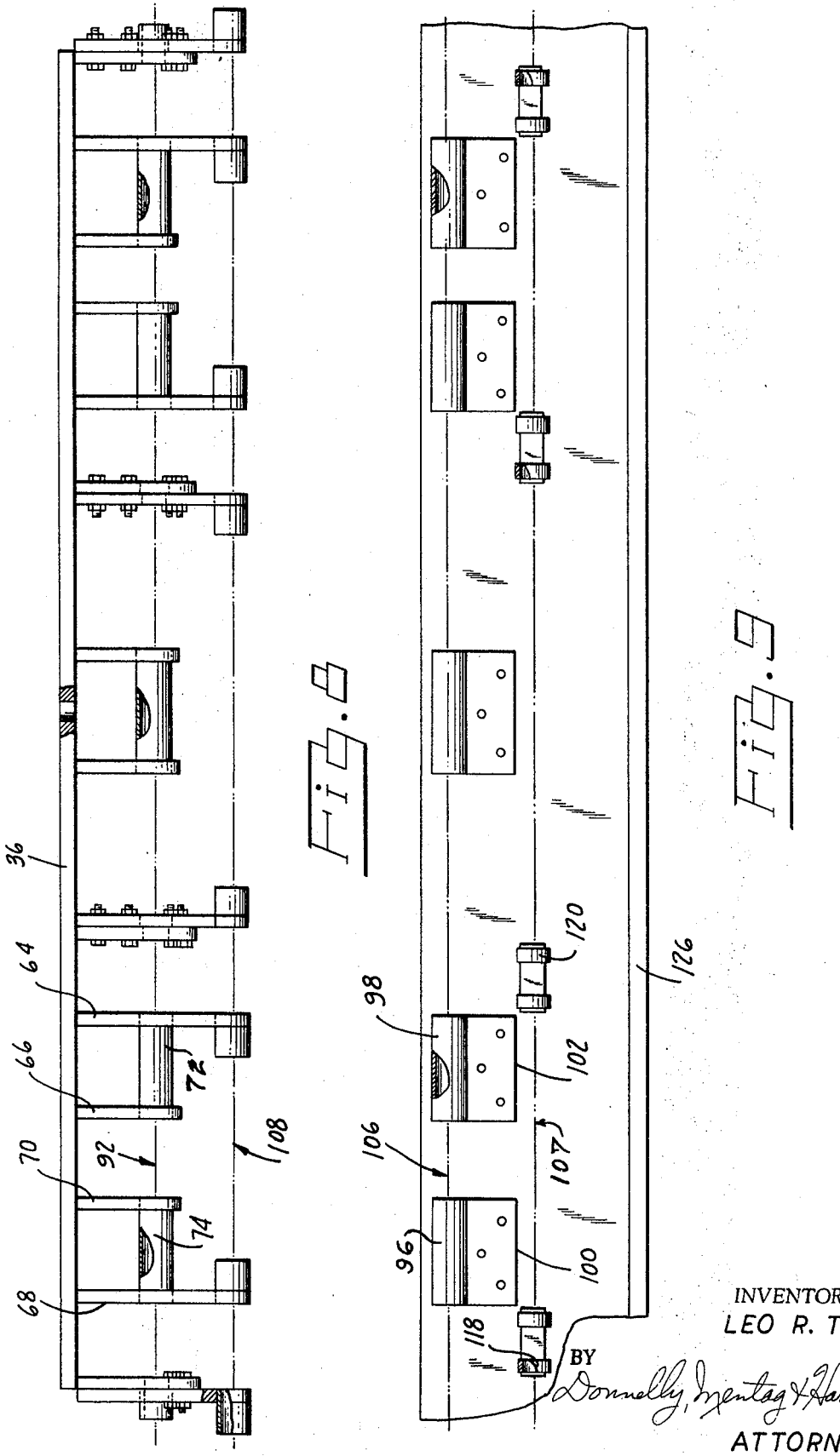

United States Patent Office 3,517,753
Patented June 30, 1970

3,517,753
TRUCK UNDERBODY SCRAPER FOR HIGHWAY MAINTENANCE VEHICLES
Leo R. Tift, Hastings, Mich., assignor to James M. Hare, Secretary of State of Michigan
Filed Dec. 4, 1967, Ser. No. 687,585
Int. Cl. E02f 3/76
U.S. Cl. 172—795          8 Claims

ABSTRACT OF THE DISCLOSURE

A scraper blade construction adapted to be mounted on the underbody chassis structure of heavy, wheeled, road maintenance vehicles, comprising a mold board and a deflector arranged in articulated fashion whereby the mold board may be raised and lowered without causing intereference with the vehicle chassis structure, and providing an optimum blade cutting edge angle with respect to the road surface.

GENERAL DESCRIPTION OF THE INVENTION

The scraper blade construction includes an articulated deflector which cooperates with an arcuately shaped mold board to avoid interference with the vehicle chassis structure. Provision is made for moving the mold board in a substantially vertical direction as the cutting edge of the scraper is raised and lowered with respect to the road surface. A linkage mechanism used to mount the mold board for vertical movement permits operation of the scraper at high speeds as the linkage accommodates the necessary deflection of the mold board when it encounters objects, high spots, raised expansion joints, etc. without overstressing the linkage mechanism or damaging the mold board itself. Because of the geometry of the linkage mechanism and the associated articulated deflector blade, the scraper can be operated at a reduced pressure as the cutting edge cuts snow and ice from the road surface.

Previous attempts to use an underbody scraper construction on heavy road maintenance vehicles have not been successful because of the inadequate clearance between the blade itself and the truck underbody chassis construction. Furthermore, such scraper blades require considerable pressure to permit the cutting edge of the scraper to cut snow and ice from the road surface. This accelerates the wear and increases the maintenance costs.

It heretofore has been impossible for such scraper constructions to be used at high speeds on highways because of the severe shock loading that is encountered as the blade engages rocks on the highway, high spots and raised expansion joints.

It is an object of my invention to provide a scraper blade construction that is adapted especially to be used with heavy duty highway maintenance trucks. Provision is made for mounting the scraper blade construction within the chassis underbody, and provision is made in the scraper blade construction itself for eliminating interference between the mold board portion of the scraper construction and the truck undercarriage. Interference is avoided by providing an articulated deflector and mold board assembly with the deflector portion of the assembly forming a continuation of the arcuate mold board surface when the mold board cutting edge is in engagement with the road surface. When the mold board is raised, the deflector blade, which is situated at the upper margin of the mold board, pivots on the mold board and is deflected forwardly, thereby avoiding interference with the truck undercarriage. The cutting edge of the mold board thus can be raised to the required height as the scraper blade is retracted.

The linkage system used for raising and lowering the cutting edge of the mold board is adapted especially to compensate for impact loading of the scraper. Yielding spring loaded members are situated in the linkage construction itself for absorbing impact loads thereby eliminating overstressing of the parts and avoiding breakage of the cutting edge.

Because of the improved impact loading it is possible to adjust the cutting angle of the cutting edge of the mold board to its optimum value which will produce the most efficient cutting action of snow and ice on the road surface. Because of the favorable angle that is made possible by the impact load compensating characteristics of the assembly, the working pressure applied to the mold board can be reduced, thereby decreasing substantially the rate of wear of the cutting edge. This, in turn, reduces the relatively high maintenance costs normally associated with conventional scraper constructions used on state and interstate highway systems.

It is possible, furthermore, for a truck using my improved scraper construction to be operated at relatively high speeds on high speed freeways. The maintenance vehicle thus can move at a rate that is more compatible with the high speed traffic flow. This improves safety in operating a maintenance vehicle of this kind. It furthermore reduces the operating time required to cover a given distance along the highway.

BRIEF DESCRIPTION OF THE FIGURES OF THE DRAWINGS

FIG. 4 is a rear elevation view of the structure of FIGS. 1, 2 and 3 as seen from the plane of section line 4—4 of FIG. 2.

FIG. 5 is a plan view of the structure of FIG. 4 as seen from the plane of section line 5—5 of FIG. 4.

FIG. 6 is a plan view of the structure of FIG. 4 although it shows in more particular detail the blade locking mechanism, which is shown only schematically in FIG. 5.

FIG. 7 is a side elevation of the sub-assembly indicated in FIG. 6 as seen from the plane of section line 7—7 of FIG. 6.

FIG. 8 is a rear elevation view showing the mounting axes for the mold board.

FIG. 9 is a rear elevation view of a sub-assembly including the linkage brackets and the various support points.

PARTICULAR DESCRIPTION OF THE INVENTION

Figure 1:
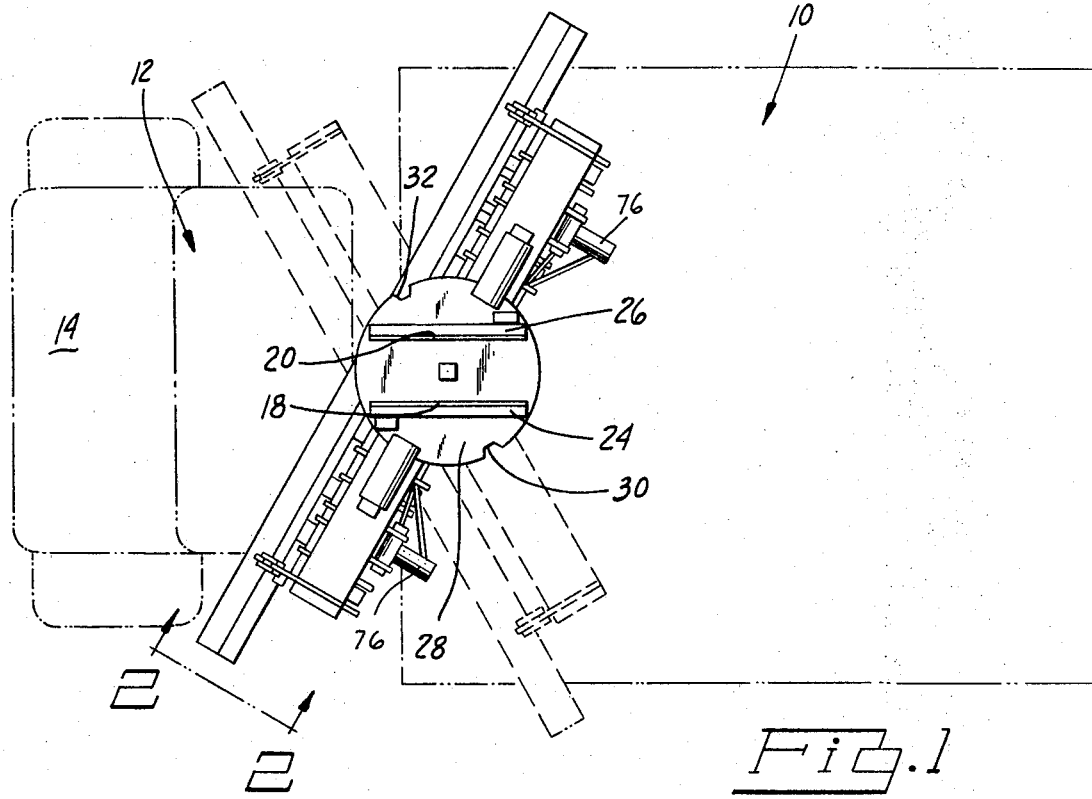
FIG. 1 shows in schematic form a plan view of a highway maintenance truck which is equipped with my improved scraper blade construction.

In FIG. 1 the numeral 10 designates generally the outline of a maintenance truck bed. Numeral 12 designates generally the outline of the truck cab. The engine compartment is shown at 14. A longitudinally extending frame member 16, seen in FIGS. 4, 5 and 6, forms a part of the vehicle truck chassis. It extends in the direction of the centerline of the truck. A pair of support plates 18 and 20 is secured to the lateral sides of the frame member 16, suitable bolts 22 being provided for this purpose.

The lower margins of the plates 18 and 20 have secured thereto longitudinally extending angle irons 24 and 26. A circular anchor plate 28 is bolted to the longitudinally extending flanges of the angle irons 24 and 26.

Plate 28 is formed with arcuately spaced tapered recesses indicated, for example, in FIG. 1 at 30 and 32. These are situated 180° out of position with respect to each other. A second set of tapered recesses also is formed in the outer periphery of the circular support plate 28. One of these is shown at 34 in FIG. 5. The second of these is situated 180° out of position with respect to recess 34. A line drawn between these latter two recesses forms an angle with a corresponding line drawn between recesses 30 and 32 which is equal to approximately 84°.

A flat horizontal bar 36 is situated directly below the circular support plate 28. Secured to the top of the plate is anchor boss 38 to which is connected, by means of an eyelet and pin connection 40, a hydraulic cylinder 42. Slidably situated in the cylinder 42 is a piston having a piston rod 44. The outer end of the rod 44 carries a pivot fork 46 within which eyelet member 48 is positioned. A pin 50 extends through the fork 46 and through an eyelet opening in the member 48 to provide a pin connection between member 48 and the piston shaft 44. Member 48 is secured by welding to a locking dog clutch member 52 having a tooth portion 54, which engages one of the peripheral recesses in the circular support plate 28. A coil spring 56 surrounds the piston rod 44 and is anchored on the cylinder 42. The spring normally urges the tooth 54 into engagement with the peripheral recesses in the plate 28.

The piston within the cylinder 42 and the cylinder itself cooperate to define a pressure chamber. When fluid pressure is admitted to the pressure chamber, piston rod 44 is retracted against the opposing force of spring 56 thereby withdrawing the tooth 54 from engagement with the tapered recesses in the periphery of the circular support plate 28.

The support plate 28 is situated substantially in the center of the bar 36. A similar tooth 54 and a similar cylinder 42 are mounted 180° out of position with respect to the tooth and cylinder shown in FIG. 6, and they act in a left-hand direction whereas the structure in FIG. 6 acts in a right-hand direction to lock the position of the bar 36 with respect to the plate 28. The companion tooth 54 and cylinder 42 are situated on the right-hand side of the plate 28 when viewed from the vantage point from which FIG. 6 is viewed.

Tooth 54, which is formed as a part of the member 52, is guided by a pair of guide members 58 and 60. These members are bolted to the bar 36, and they are bridged together by another guide member 62.

As seen in FIG. 8, a pair of brackets 64 and 66 extend below the bar 36. A companion pair of brackets 68 and 70 extend below the bar 36 adjacent the brackets 64 and 66. Each bracket pair is bridged by one of the circular pivot members 72 and 74. These receive bearing pins which extend from either side of a linkage member 82. Secured to the interior of the brackets 66 and 70 is a pair of bearing plates 68 and 80. The bearing pins, one of which is shown at 81, are received within the bearing plates 78 and 80 thereby providing a pivotal support for the cylinder 76. The pivotal axis is at 92.

Linkage member 82 is secured by means of an eyelet and pin connection 84 to one end of a piston rod 86. This rod extends from the interior of the cylinder 76 and is connected to a piston that is slidably situated within the cylinder 76. The piston and the cylinder cooperate to define a pressure cavity that is in fluid communication with pressure conduit 88.

Linkage member 82 is pivoted by pins, one of which is shown at 90, to the pivot members 72 and 74. Member 82 can oscillate about a pivotal axis 92 which is common to the pivot members 72 and 74.

The member 82 includes a second pivot point on the axis of pivot pin 94. This pin is received within eyelets 96 and 98 formed in brackets 100 and 102. These in turn are secured to the rear face of a curved mold board 104. The pivotal axis for the pin 94 is shown at 106 in FIG. 9.

Pivot axis 92 is fixed and pivot axis 106 is movable. A third pivot axis, which also is fixed, is identified in FIG. 8 by reference character 108. This axis coincides with the axis of pivot pin 110 which bridges the end of brackets 68 and 64. A reaction spring anchor 112 is pivoted on the axis 108 and is supported by the brackets 68 and 64. Extending through the member 112 is a linkage element 114, the end of which is pivoted on axis 107 by means of pivot pins 116 to brackets 118 and 120 secured to the rear face of the mold board 104. A compression spring 122 is situated between the pin 116 and the anchor member 112. The anchor pin 116 normally is urged away from the member 112 by the spring 122. Movement of the element 114 with respect to the member 112 is limited by a stop nut 124 threaded on the end of the element 114.

Figures 2, 3:
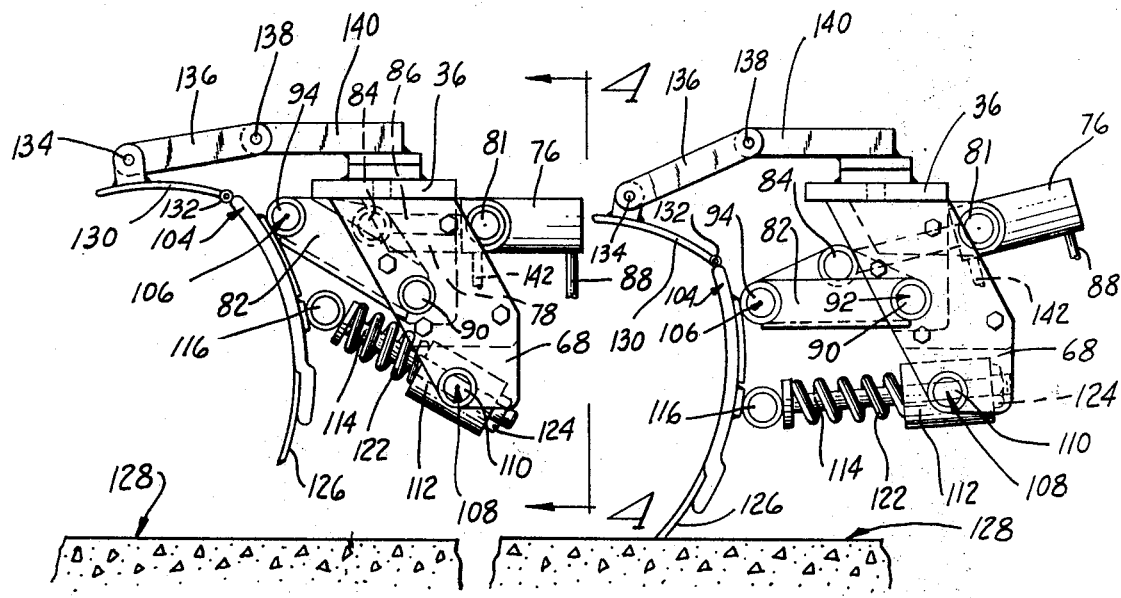
FIG. 2 is an end elevation view of the structure in FIG. 1 as seen from the plane of section line 2—2 of FIG. 1.
FIG. 3 is a view similar to FIG. 2 although the elements of the construction in FIG. 2 have been shown in the operating position rather than in a retracted position.

A hardened steel cutting edge 126 is located at the lower margin of the mold board 104. It is adapted to engage the ground or road surface 128 with a forwardly disposed cutting angle. The engaged position of the blade 126 is shown in FIG. 3. FIG. 2 shows the mold board in the raised position.

A deflector plate 130 is hinged to the upper margin of the mold board 104, as shown at 132. It is contoured so that its forward surface will provide a continuous extension of the mold board itself. It tends to assume the contour of the mold board when the mold board is in the position shown in FIG. 3. The uppermost margin of the deflector plate 130 is hinged at 134 to adjusting link members, one of which is shown at 136. The right-hand end of the link 136 is pinned at 138 to arm 140. A corresponding arm is provided for each of the other links, which are companions to the link 136. The arm 140 is welded or otherwise permanently secured to the bar 36.

Conduit 88, as mentioned earlier, distributes control pressure to one side of the cylinder 76, thereby causing the piston rod 86 to extend. Control pressure may be admitted to the opposite side of the cylinder 76 through conduit 142, thereby causing the piston rod 86 to retract. When the piston rod 86 is retracted, linkage element 82 pivots in a clockwise direction about the fixed pivot pin 114. This linkage element and the linkage element 114 cooperate to define two sides of a parallelogram type linkage. The left-hand side of the parallelogram type linkage system is defined by the mold board 104 itself. The right-hand side of the parallelogram type linkage is defined by the portion of the brackets 68 and 64 between the axes 92 and 108.

As the control cylinder 76 retracts the piston rod 86 in a right-hand direction, the mold board 104 moves in a substantially vertical direction with respect to the horizontal road surface 128. At that time, the deflector plate 130 pivots in a counter-clockwise direction with respect to the hinged connection 132. But the operating height of the scraper assembly is not increased to a value that would cause interference between the scraper assembly and the vehicle and the carriage.

As the mold board 104 is moved in a downward direction upon movement of the piston rod 86 outwardly, the linkage element 82 is pivoted in a counter-clockwise direction about the pivot pin 90. The angle that is formed by the cutting edge 126 with respect to the road surface 128 is an acute angle and is chosen to provide optimum cutting action. If the scraper blade should hit an obstruction, the effective distance between the pivot pins 116 and 110 will decrease as the spring 122 yields. This provides compensation for impact forces. After the obstruction has been passed, the spring 122 will maintain the necessary length for the linkage element 114 to permit the optimum cutting angle to be maintained for the cutting edge 126.

It is not necessary to maintain a high scraping pressure on the cutting edge 126 and, accordingly, wear of the cutting edge will be relatively slight in comparison to corresponding rate of wear for prior art mechanisms.

Having thus described a preferred form of my invention, what I claim and desire to secure by U.S. Letters Patent is:

1. A road scraper assembly for use with a road vehicle having an undercarriage, a support plate secured to said undercarriage, a fixed bar extending in a substantially horizontal direction beneath said undercarriage, means for fixing the angular position of said bar with respect to said support plate, a mold board mounted on one side of said bar, a first linkage element having one end thereof pivoted to the upper part of said mold board on its rearward side, a second linkage element having one end thereof pivotally connected to said mold board at a location below said upper part on said rearward side, bracket means supported by said fixed bar for pivotally supporting the other end of each of said linkage elements, a deflector plate extending in a horizontal direction with respect to the road surface having one margin thereof pivotally secured to the upper margin of said mold board, motor means operatively connected between said fixed bar and said mold board to move said mold board vertically, a supporting link supported at one end thereof by said bar, the other end of said supporting link being pivotally connected to said deflector plate adjacent the other margin thereof whereby said deflector plate is rotated toward a generally horizontal position as the mold board is raised.

2. A road scraper assembly for use with a road vehicle having an undercarriage, a support plate secured to said undercarriage, a fixed bar extending in a substantially horizontal direction beneath said undercarriage, means for fixing the angular position of said bar with respect to said support plate, a mold board mounted on one side of said bar, a first linkage element having one end thereof pivoted to the upper part of said mold board on its rearward side, a second linkage element having one end thereof pivoted to said mold board at a location below said upper part on said rearward side, bracket means supported by said bar for pivotally supporting the other end of each of said linkage elements, a deflector plate extending in a horizontal direction with respect to the road surface having one margin thereof secured to the upper margin of said mold board, a supporting link supported at one end thereof by said bar, the other end of said supporting link being pivotally connected to said deflector plate adjacent the other margin thereof whereby said deflector plate is rotated toward a generally horizontal position as the mold board is raised, a piston and cylinder assembly including a hydraulic piston pivotally connected to said first linkage element intermediate its ends, said piston and cylinder assembly being pivotally connected to said bar, and conduit means for distributing control pressure to opposite parts of said cylinder thereby causing said first named linkage element to oscillate in one direction to raise said mold board and in the opposite direction to lower said mold board.

3. A road scraper assembly for use with a road vehicle as defined in claim 1, wherein the forward surface of said mold board is concave, the forward surface of said deflector plate being generally concave and forming an extension of the concave surface of said mold board, and a cutting edge at the lower margin of said mold board forming an acute cutting angle with respect to the road surface as said mold board is lowered.

4. A road scraper assembly for use with a road vehicle as defined in claim 2, wherein the forward surface of said mold board is concave, the forward surface of said deflector plate being generally concave and forming an extension of the concave surface of said mold board, and a cutting edge at the lower margin of said mold board forming an acute cutting angle with respect to the road surface as said mold board is lowered.

5. A road scraper assembly for use with a road vehicle as defined in claim 1, wherein said second linkage element comprises a movable rod, a reaction member pivotally carried by said bar, said rod being slidably supported by said reaction member, one end of the pivotal connection between said mold board and said second linkage element being at one end of said movable rod, and a compression spring situated under preload between said reaction member and the pivotal connection of said second linkage element with said mold board, said spring yielding to permit deflection of said mold board under impact loads as said scraper assembly engages obstructions.

6. A road scraper assembly for use with a road vehicle as defined in claim 2, wherein said second linkage element comprises a movable rod, a reaction member pivotally carried by said bar, and a compression spring situated under preload between said reaction member and the pivotal connection of said second linkage element with said mold board, said spring yielding to permit deflection of said mold board under impact loads as said scraper assembly engages obstructions.

7. A road scraper assembly for use with a road vehicle as defined in claim 3, wherein said second linkage element comprises a movable rod, a reaction member pivotally carried by said bar, and a compression spring situated under preload between said reaction member and the pivotal connection of said second linkage element with said mold board, said spring yielding to permit deflection of said mold board under impact loads as said scraper assembly engages obstructions.

8. A road scraper assembly for use with a road vehicle as defined in claim 5, wherein said second linkage element comprises a movable rod, a reaction member pivotally carried by said bar, and a compression spring situated under preload between said reaction member and the pivotal connection of said second linkage element with said mold board, said spring yielding to permit deflection of said mold board under impact loads as said scraper assembly engages obstructions.

References Cited

UNITED STATES PATENTS

| | | | |
|---|---|---|---|
| 1,728,032 | 9/1929 | Bising | 37—42 |
| 1,900,703 | 3/1933 | Frink | 37—44 |
| 1,926,011 | 9/1933 | Soule | 37—44 |
| 2,129,970 | 9/1938 | Simonds | 172—794 X |
| 3,238,647 | 3/1966 | Hall et al. | 172—801 |

ROBERT E. PULFREY, Primary Examiner

A. E. KOPECKI, Assistant Examiner

U.S. Cl. X.R.

172—792, 794, 508

UNITED STATES PATENT OFFICE
CERTIFICATE OF CORRECTION

Patent No. 3,517,753                    Dated  June 30, 1970

Inventor(s)  Leo R. Tift

It is certified that error appears in the above-identified patent and that said Letters Patent are hereby corrected as shown below:

Column 6, line 40, "claim 5" should be -- claim 4 --.
(for reference see application claim 8, line 4).

SIGNED AND
SEALED
OCT 6 - 1970

(SEAL)
Attest:

Edward M. Fletcher, Jr.
Attesting Officer

WILLIAM E. SCHUYLER, JR.
Commissioner of Patents